US012625921B2

(12) United States Patent
Akagi et al.

(10) Patent No.: US 12,625,921 B2
(45) Date of Patent: May 12, 2026

(54) ESTIMATION APPARATUS, ESTIMATION METHOD AND ESTIMATION PROGRAM

(71) Applicant: NTT, Inc., Tokyo (JP)

(72) Inventors: Yasunori Akagi, Tokyo (JP); Yusuke Tanaka, Tokyo (JP); Takeshi Kurashima, Tokyo (JP); Hiroyuki Toda, Tokyo (JP)

(73) Assignee: NTT, Inc., Tokyo (JP)

( * ) Notice: Subject to any disclaimer, the term of this patent is extended or adjusted under 35 U.S.C. 154(b) by 593 days.

(21) Appl. No.: 17/926,582

(22) PCT Filed: May 28, 2020

(86) PCT No.: PCT/JP2020/021223
§ 371 (c)(1),
(2) Date: Nov. 19, 2022

(87) PCT Pub. No.: WO2021/240753
PCT Pub. Date: Dec. 2, 2021

(65) Prior Publication Data
US 2023/0244753 A1 Aug. 3, 2023

(51) Int. Cl.
*G06F 17/18* (2006.01)
*G06Q 10/04* (2023.01)
*H04W 4/02* (2018.01)
*H04W 4/029* (2018.01)

(52) U.S. Cl.
CPC .............. *G06F 17/18* (2013.01); *G06Q 10/04* (2013.01); *H04W 4/025* (2013.01); *H04W 4/029* (2018.02)

(58) Field of Classification Search
CPC ......... G06F 17/18; G06F 16/90; G06Q 10/04; H04W 4/025; H04W 4/029
See application file for complete search history.

(56) References Cited

U.S. PATENT DOCUMENTS

| | | | | |
|---|---|---|---|---|
| 6,952,682 | B1 * | 10/2005 | Wellman | G06Q 40/00 705/37 |
| 11,109,194 | B1 * | 8/2021 | Pinheiro | H04W 4/029 |

(Continued)

OTHER PUBLICATIONS

Akagi et al. (2018) "A Fast and Accurate Method for Estimating People Flow from Spatiotemporal Population Data," Proceedings of the Twenty-Seventh International Joint Conference on Artificial Intelligence (IJCAI-18), pp. 3293-3300.

(Continued)

*Primary Examiner* — Qun Shen

(57) ABSTRACT

An estimation apparatus includes a memory; and a processor configured to execute: receiving spatiotemporal population data and a probability of movement between areas as input; constructing a collective graphical model (CGM) in a path graph for estimating a number of people who have moved between areas from the spatiotemporal population data and the probability of movement between areas; generating an instance of a minimum cost flow problem for performing MAP estimation on the constructed CGM; solving the instance of the minimum cost flow problem to estimate the number of people who have moved between areas at individual time steps; and outputting the estimated number of people who have moved between the areas at the individual time steps.

5 Claims, 10 Drawing Sheets

(56)                References Cited

U.S. PATENT DOCUMENTS

| | | | | |
|---|---|---|---|---|
| 2003/0058798 A1* | 3/2003 | Fleischer | H04L 45/123 | 370/241 |
| 2004/0083126 A1* | 4/2004 | Svenson | G06Q 30/0202 | 705/7.31 |
| 2005/0166169 A1* | 7/2005 | Kurzum | G06F 30/392 | 716/122 |
| 2007/0265533 A1* | 11/2007 | Tran | A61B 5/0006 | 600/528 |
| 2009/0252416 A1* | 10/2009 | Komodakis | G06F 18/295 | 382/180 |
| 2012/0115505 A1* | 5/2012 | Miyake | H04W 4/027 | 455/456.1 |
| 2014/0188377 A1* | 7/2014 | Bonawitz | B64B 1/60 | 701/120 |
| 2019/0310644 A1* | 10/2019 | Zhang | G01C 21/3453 | |
| 2023/0077176 A1* | 3/2023 | Yan | H04W 72/53 | |

OTHER PUBLICATIONS

Sheldon et al. (2011) "Collective Graphical Models," In Proceedings of the 24th International Conference on Neural Information Processing Systems, pp. 1161-1169.
Sheldon et al. (2013) "Approximate Inference in Collective Graphical Models," In Proceedings of the 30th International Conference on Machine Learning, pp. 1004-1012.
Sun et al. (2015) "Message Passing for Collective Graphical Model," In Processing of the 32nd International Conference on Machine Learning, pp. 853-861.
Ahuja et al. (1993) "Network Flows: Theory, Algorithms and Applications," Prentice Hall.

* cited by examiner

Fig. 2

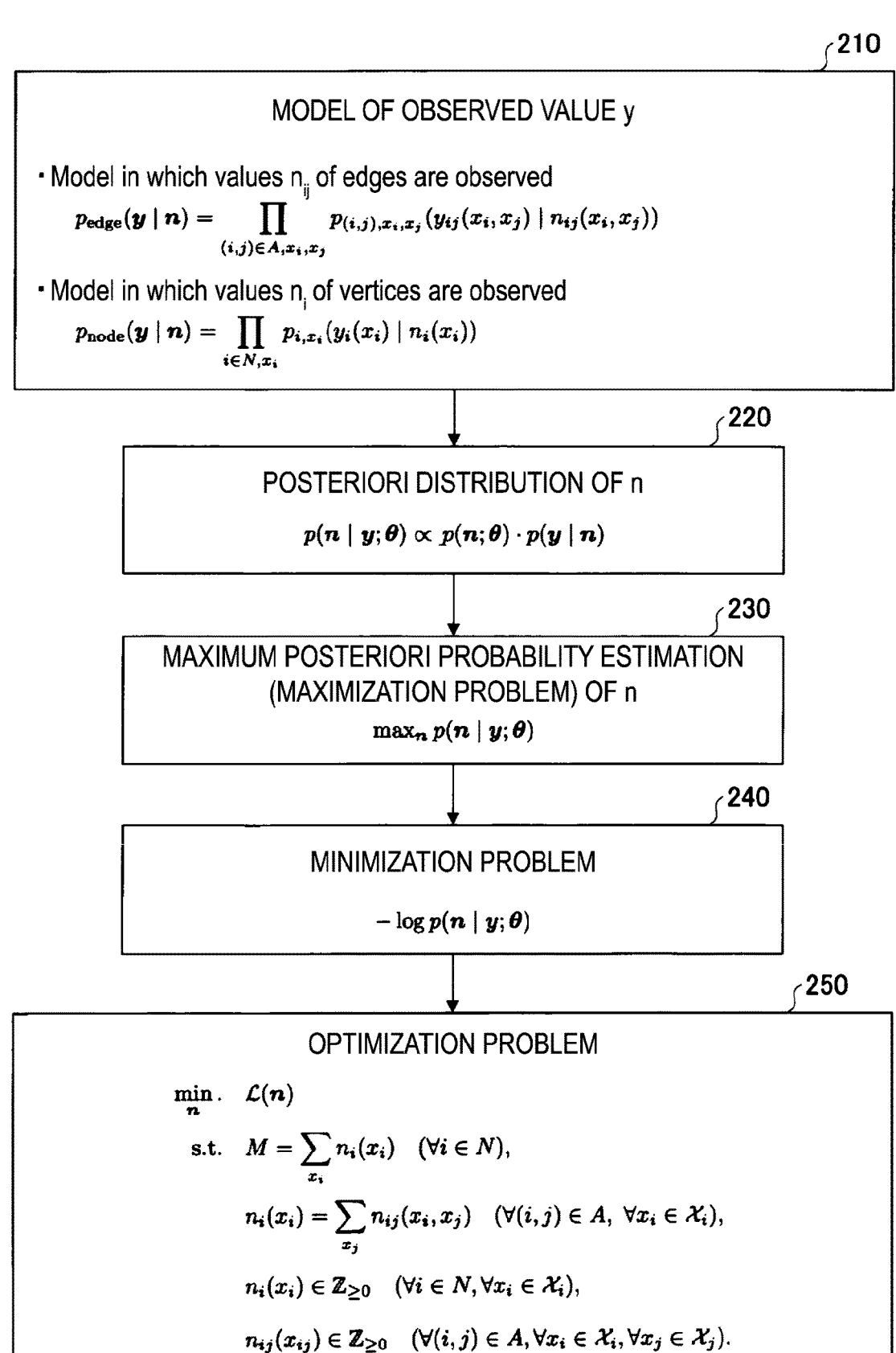

_210_

MODEL OF OBSERVED VALUE y

· Model in which values $n_{ij}$ of edges are observed $$p_{\text{edge}}(\boldsymbol{y} \mid \boldsymbol{n}) = \prod_{(i,j) \in A, x_i, x_j} p_{(i,j), x_i, x_j}(y_{ij}(x_i, x_j) \mid n_{ij}(x_i, x_j))$$

· Model in which values $n_i$ of vertices are observed $$p_{\text{node}}(\boldsymbol{y} \mid \boldsymbol{n}) = \prod_{i \in N, x_i} p_{i, x_i}(y_i(x_i) \mid n_i(x_i))$$

_220_

POSTERIORI DISTRIBUTION OF n

$$p(\boldsymbol{n} \mid \boldsymbol{y}; \boldsymbol{\theta}) \propto p(\boldsymbol{n}; \boldsymbol{\theta}) \cdot p(\boldsymbol{y} \mid \boldsymbol{n})$$

_230_

MAXIMUM POSTERIORI PROBABILITY ESTIMATION (MAXIMIZATION PROBLEM) OF n

$$\max_{\boldsymbol{n}} p(\boldsymbol{n} \mid \boldsymbol{y}; \boldsymbol{\theta})$$

_240_

MINIMIZATION PROBLEM

$$- \log p(\boldsymbol{n} \mid \boldsymbol{y}; \boldsymbol{\theta})$$

_250_

OPTIMIZATION PROBLEM

$$\min_{\boldsymbol{n}} . \quad \mathcal{L}(\boldsymbol{n})$$

$$\text{s.t.} \quad M = \sum_{x_i} n_i(x_i) \quad (\forall i \in N),$$

$$n_i(x_i) = \sum_{x_j} n_{ij}(x_i, x_j) \quad (\forall (i, j) \in A, \forall x_i \in \mathcal{X}_i),$$

$$n_i(x_i) \in \mathbb{Z}_{\geq 0} \quad (\forall i \in N, \forall x_i \in \mathcal{X}_i),$$

$$n_{ij}(x_{ij}) \in \mathbb{Z}_{\geq 0} \quad (\forall (i, j) \in A, \forall x_i \in \mathcal{X}_i, \forall x_j \in \mathcal{X}_j).$$

- $n_{ijk}$: Number of people who have moved from area j to k over time i to i+1
- $\phi_{ijk}$: Probability of movement (movement probability) from area j to area k over time i to i+1
- $n_{ij}$: True population (without observation noise) in area j at time i
- $y_{ij}$: Observed population of area j at time i

FORMULATION OF MINIMUM COST FLOW PROBLEM $$\min_{x \in \mathbb{Z}^{|E|}} \sum_{(i,j) \in E} c_{ij}(x_{ij}),$$

Figure 4:
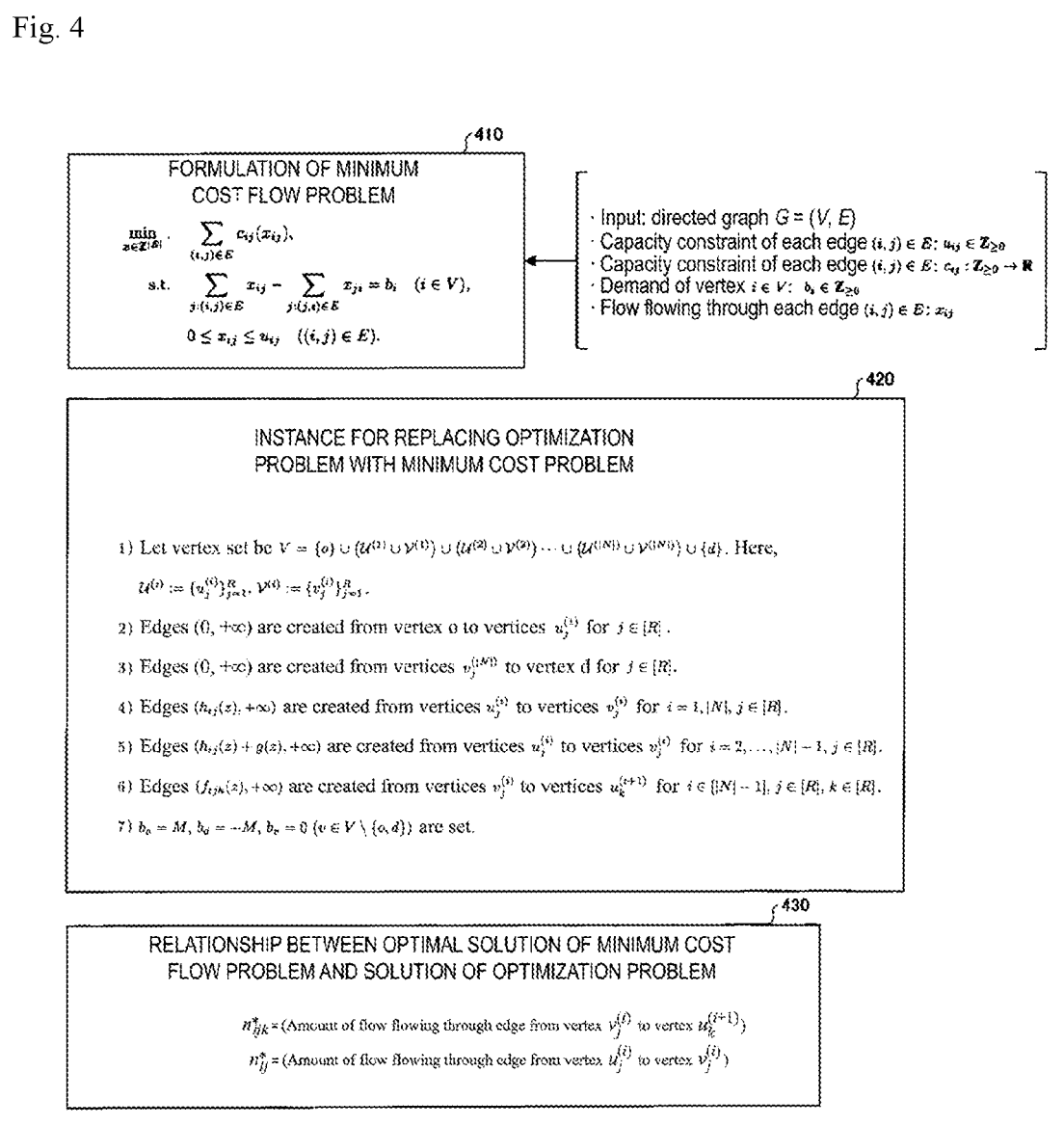

$$\text{s.t.} \quad \sum_{j:(i,j) \in E} x_{ij} - \sum_{j:(j,i) \in E} x_{ji} = b_i \quad (i \in V),$$

$$0 \leq x_{ij} \leq u_{ij} \quad ((i,j) \in E).$$

- Input: directed graph $G = (V, E)$
- Capacity constraint of each edge $(i,j) \in E$: $u_{ij} \in \mathbb{Z}_{\geq 0}$
- Capacity constraint of each edge $(i,j) \in E$: $c_{ij} : \mathbb{Z}_{\geq 0} \to \mathbb{R}$
- Demand of vertex $i \in V$: $b_i \in \mathbb{Z}_{\geq 0}$
- Flow flowing through each edge $(i,j) \in E$: $x_{ij}$

420

INSTANCE FOR REPLACING OPTIMIZATION PROBLEM WITH MINIMUM COST PROBLEM

1) Let vertex set be $V = \{o\} \cup (U^{(1)} \cup V^{(1)}) \cup (U^{(2)} \cup V^{(2)}) \cdots \cup (U^{(|N|)} \cup V^{(|N|)}) \cup \{d\}$. Here, $U^{(i)} := \{u_j^{(i)}\}_{j=1}^{R}, V^{(i)} := \{v_j^{(i)}\}_{j=1}^{R}$.

2) Edges $(0, +\infty)$ are created from vertex o to vertices $u_j^{(1)}$ for $j \in [R]$.

3) Edges $(0, +\infty)$ are created from vertices $v_j^{(|N|)}$ to vertex d for $j \in [R]$.

4) Edges $(h_{ij}(z), +\infty)$ are created from vertices $u_j^{(i)}$ to vertices $v_j^{(i)}$ for $i = 1, |N|, j \in [R]$.

5) Edges $(h_{ij}(z) + g(z), +\infty)$ are created from vertices $u_j^{(i)}$ to vertices $v_j^{(i)}$ for $i = 2, \ldots, |N| - 1, j \in [R]$.

6) Edges $(f_{ijk}(z), +\infty)$ are created from vertices $v_j^{(i)}$ to vertices $u_k^{(i+1)}$ for $i \in [|N| - 1], j \in [R], k \in [R]$.

7) $b_o = M, b_d = -M, b_v = 0 \ (v \in V \setminus \{o, d\})$ are set.

430

RELATIONSHIP BETWEEN OPTIMAL SOLUTION OF MINIMUM COST FLOW PROBLEM AND SOLUTION OF OPTIMIZATION PROBLEM $n_{ijk}^{*} = $ (Amount of flow flowing through edge from vertex $v_j^{(i)}$ to vertex $u_k^{(i+1)}$)

$n_{ij}^{*} = $ (Amount of flow flowing through edge from vertex $u_j^{(i)}$ to vertex $v_j^{(i)}$)

Fig. 5

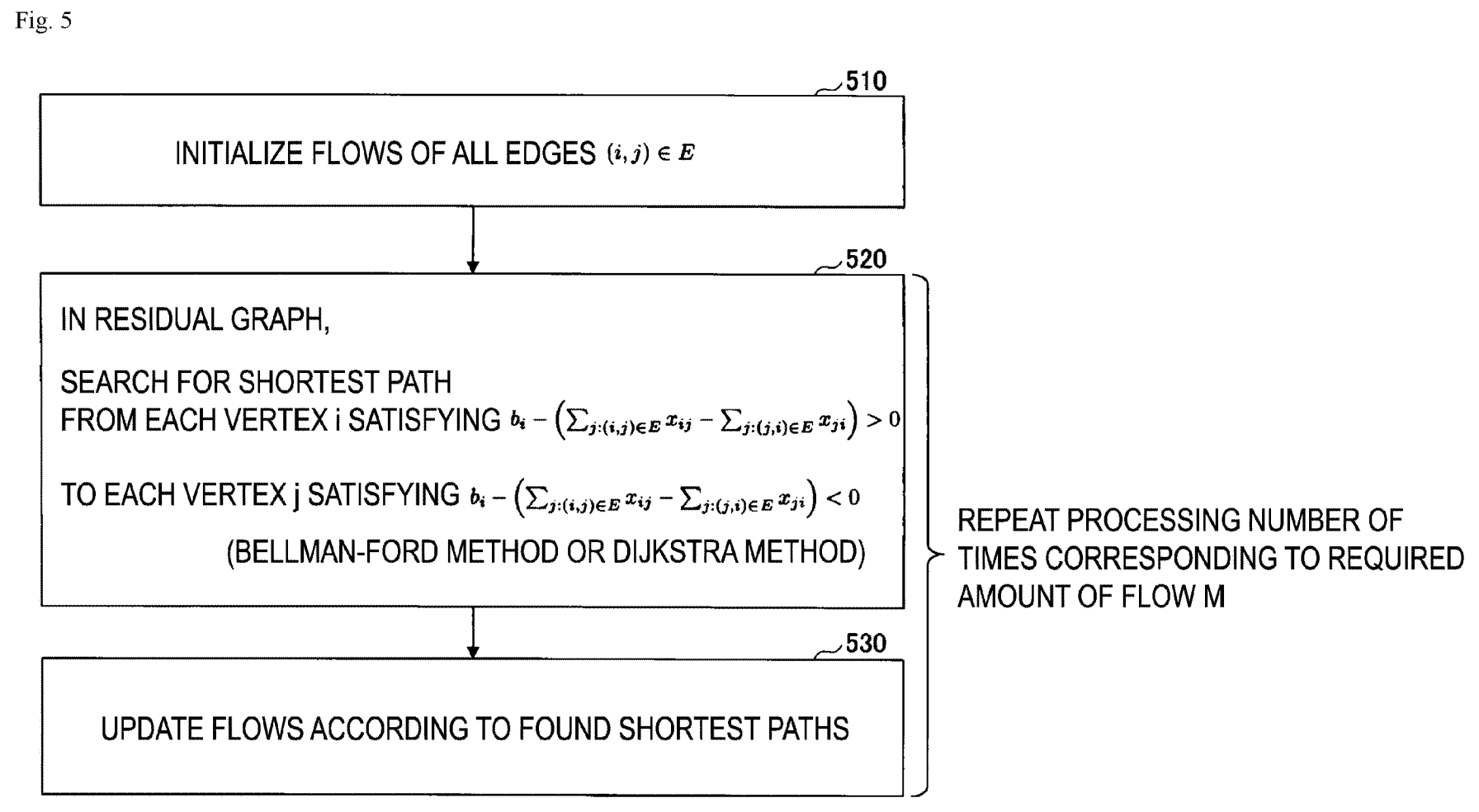

REPEAT PROCESSING NUMBER OF TIMES CORRESPONDING TO REQUIRED AMOUNT OF FLOW M

510

INITIALIZE FLOWS OF ALL EDGES $(i, j) \in E$

520

IN RESIDUAL GRAPH,

SEARCH FOR SHORTEST PATH
FROM EACH VERTEX i SATISFYING $b_i - \left( \sum_{j:(i,j) \in E} x_{ij} - \sum_{j:(j,i) \in E} x_{ji} \right) > 0$ TO EACH VERTEX j SATISFYING $b_i - \left( \sum_{j:(i,j) \in E} x_{ij} - \sum_{j:(j,i) \in E} x_{ji} \right) < 0$
(BELLMAN-FORD METHOD OR DIJKSTRA METHOD)

530

UPDATE FLOWS ACCORDING TO FOUND SHORTEST PATHS

| DEPARTURE TIME STAMP | DEPARTURE AREA | ARRIVAL AREA | MOVEMENT PROBABILITY |
|---|---|---|---|
| 7 AM | 001 | 001 | 0.1 |
| 8 AM | 002 | 002 | 0.4 |
| 9 AM | 003 | 001 | 0.3 |

820

| TIME STAMP | AREA ID | POPULATION INFORMATION |
|---|---|---|
| 7 AM | 001 | 123 |
| 8 AM | 002 | 234 |
| 9 AM | 003 | 131 |

830

| DEPARTURE TIME STAMP | DEPARTURE AREA | ARRIVAL AREA | ESTIMATED MOVED PEOPLE COUNT |
|---|---|---|---|
| 7 AM | 001 | 001 | 40 |
| 8 AM | 002 | 002 | 20 |
| 9 AM | 003 | 001 | 10 |

START MOVED PEOPLE COUNT
ESTIMATION PROCESS

S1001

INPUT MOVEMENT PROBABILITY DATA

S1002

INPUT TIME-BASED AREA POPULATION DATA

S1003

CONSTRUCT OGM

S1004

FORMULATE OPTIMIZATION PROBLEM

S1005

GENERATE INSTANCE OF MINIMUM
COST FLOW PROBLEM

S1006

ESTIMATE MOVED PEOPLE COUNT
BY SHORTEST PATH ITERATION

S1007

OUTPUT MOVED PEOPLE COUNT

TERMINATE MOVED PEOPLE
COUNT ESTIMATION PROCESS

ESTIMATION APPARATUS, ESTIMATION METHOD AND ESTIMATION PROGRAM

CROSS-REFERENCE TO RELATED APPLICATIONS

This application is a U.S. National Stage Application filed under 35 U.S.C. § 371 claiming priority to International Patent Application No. PCT/JP2020/021223, filed on 28 May 2020, the disclosure of which is hereby incorporated herein by reference in its entirety.

TECHNICAL FIELD

The present disclosure relates to an estimation apparatus, an estimation method, and an estimation program.

BACKGROUND ART

Generally, positional information of individuals obtained from a global positioning system (GPS) or the like is provided as spatiotemporal population data in which individuals cannot be tracked in consideration of privacy. Spatiotemporal population data is data indicating populations of areas at individual time steps where the areas refer to, for example, areas obtained by dividing a geographical space into grid cells.

As a technique for estimating the number of people who have moved between areas at individual time steps, based on such spatiotemporal population data, for example, a maximum a posteriori (MAP) estimation technique on a collective graphical model (CGM) in a path graph, has been known.

CITATION LIST

Non Patent Literature

NPL 1: Yasunori Akagi, Takuya Nishimura, Takeshi Kurashima, Hiroyuki Toda, "A Fast and Accurate Method for Estimating People Flow from Spatiotemporal Population Data," Proceedings of the Twenty-Seventh International Joint Conference on Artificial Intelligence (IJCAI-18), pp. 3293-3300, 2018.

NPL 2: D. R. Sheldon and T. G. Dietterich, "Collective Graphical Models," In Proceedings of the 24th International Conference on Neural Information Processing Systems, pp. 1161-1169, 2011.

SUMMARY OF THE INVENTION

Technical Problem

However, in the case of the above estimation technique, Stirling's approximation is applied to a factorial part of an objective function, and hence, a solution far from a correct solution may be output when the total number of samples is small. This is because Stirling's approximation is not accurate when the total number of samples is small.

Further, in the case of the above estimation technique, a feasible region is continuously relaxed (that is, a constraint of taking only integer values is removed) when optimizing the objective function, and hence, a solution of a non-integer value (a non-sparse solution) may be output.

Thus, upon estimating the number of people who have moved between areas at individual time steps based on spatiotemporal population data, an estimation method is required that is capable of outputting a more accurate sparse solution in a MAP estimation on a CGM in a path graph.

It is an object of the present disclosure to improve the estimation accuracy when estimating the number of people who have moved between areas at individual time steps based on spatiotemporal population data.

Means for Solving the Problem

According to an aspect of the present disclosure, an estimation apparatus includes an input unit configured to receive spatiotemporal population data and a probability of movement between areas as input, a construction unit configured to construct a CGM in a path graph for estimating a number of people who have moved between areas from the spatiotemporal population data and the probability of movement between areas, a generation unit configured to generate an instance of a minimum cost flow problem for performing MAP estimation in the constructed CGM, an estimation unit configured to solve the instance of the minimum cost flow problem to estimate the number of people who have moved between areas at individual time steps, and an output unit configured to output the estimated number of people who have moved between areas at the individual time steps.

Effects of the Invention

According to the present disclosure, the estimation accuracy when estimating the number of people who have moved between areas at individual time steps based on spatiotemporal population data can be improved.

BRIEF DESCRIPTION OF DRAWINGS

FIG. 2 is a second diagram for explaining the overview of MAP estimation on a CGM.

FIG. 4 is a diagram for explaining an overview of an instance of a minimum cost flow problem.

FIG. 5 is a diagram for explaining a shortest path iteration method used when solving an instance of a minimum cost flow problem.

FIG. 8 is a diagram showing an example of data stored in storage units.

DESCRIPTION OF EMBODIMENTS

Figure 1:
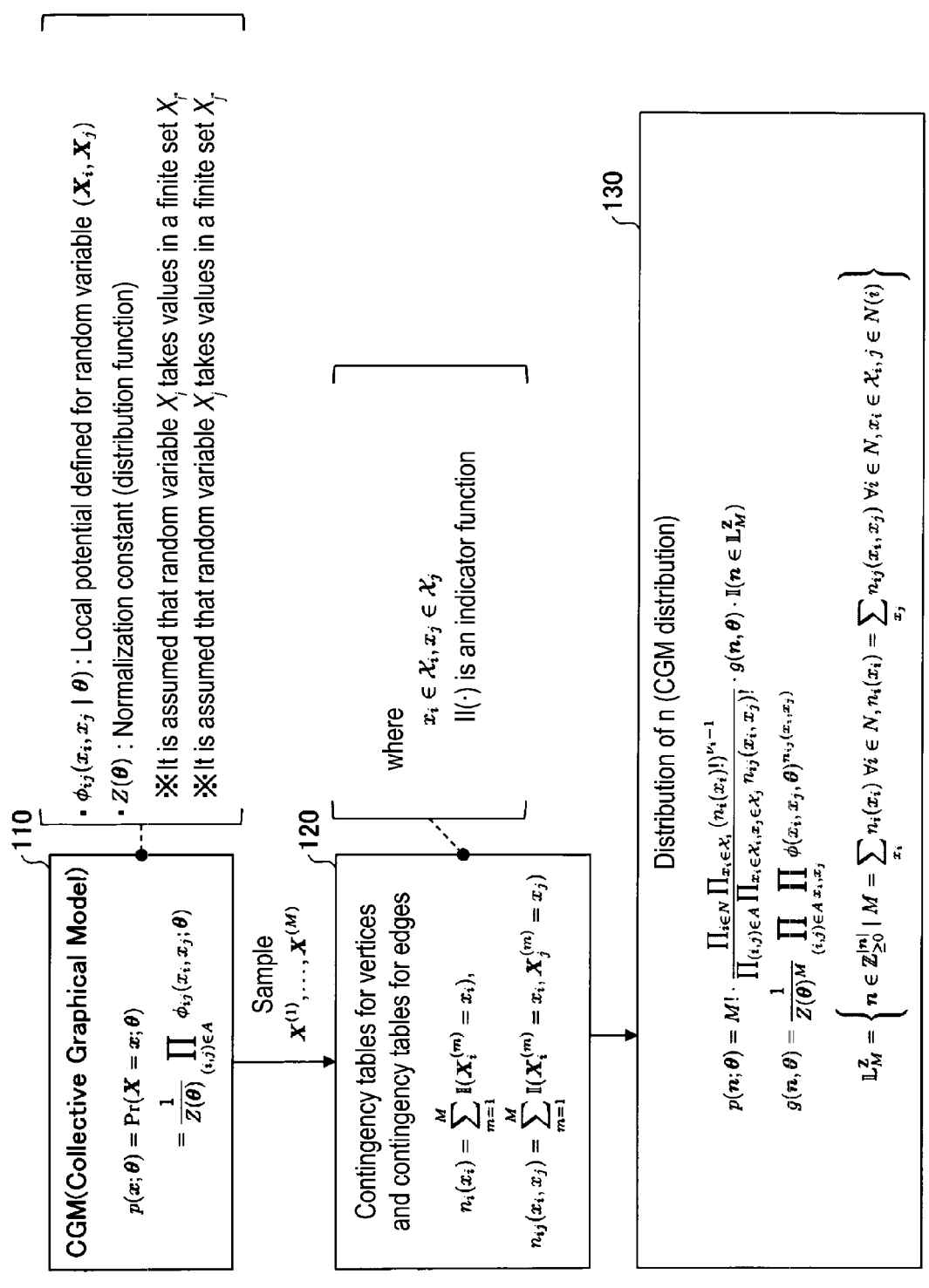
FIG. 1 is a first diagram for explaining an overview of MAP estimation on a CGM.

Hereinafter, embodiments will be described with reference to the accompanying drawings. In the present specification and drawings, components having substantially the same functional configuration are denoted by the same reference numerals and duplicate description thereof will be omitted.

First Embodiment

<Overview of Estimation Apparatus>

First, an overview of an estimation apparatus according to the present embodiment will be described. In performing MAP estimation on a CGM to improve the estimation accuracy when estimating the number of people who have moved between areas at individual time steps from spatiotemporal population data, the estimation apparatus according to the present embodiment constructs a CGM in a path graph, then, generates an instance of a minimum cost flow problem for performing MAP estimation in the CGM, and solves the instance of the minimum cost flow problem using a shortest path iteration method, to estimate the number of people who have moved between areas at individual time steps.

That is, the estimation apparatus according to the present embodiment replaces an optimization problem of an objective function with a minimum cost flow problem, to implement an estimation method in which Stirling's approximation is not applied to the factorial part of the objective function and a feasible region is not continuously relaxed when optimizing the objective function. Thereby, the estimation apparatus according to the present embodiment can output a sparse solution with higher accuracy.

Thus, in the following, an overview of MAP estimation on a CGM in a path graph, an overview of an instance of a minimum cost flow problem for performing MAP estimation on a CGM, and an overview of a shortest path iteration method for solving the instance of the minimum cost flow problem, will be described, and then, the estimation apparatus will be described in detail.

<Overview of MAP Estimation in CGM>

Figure 3:
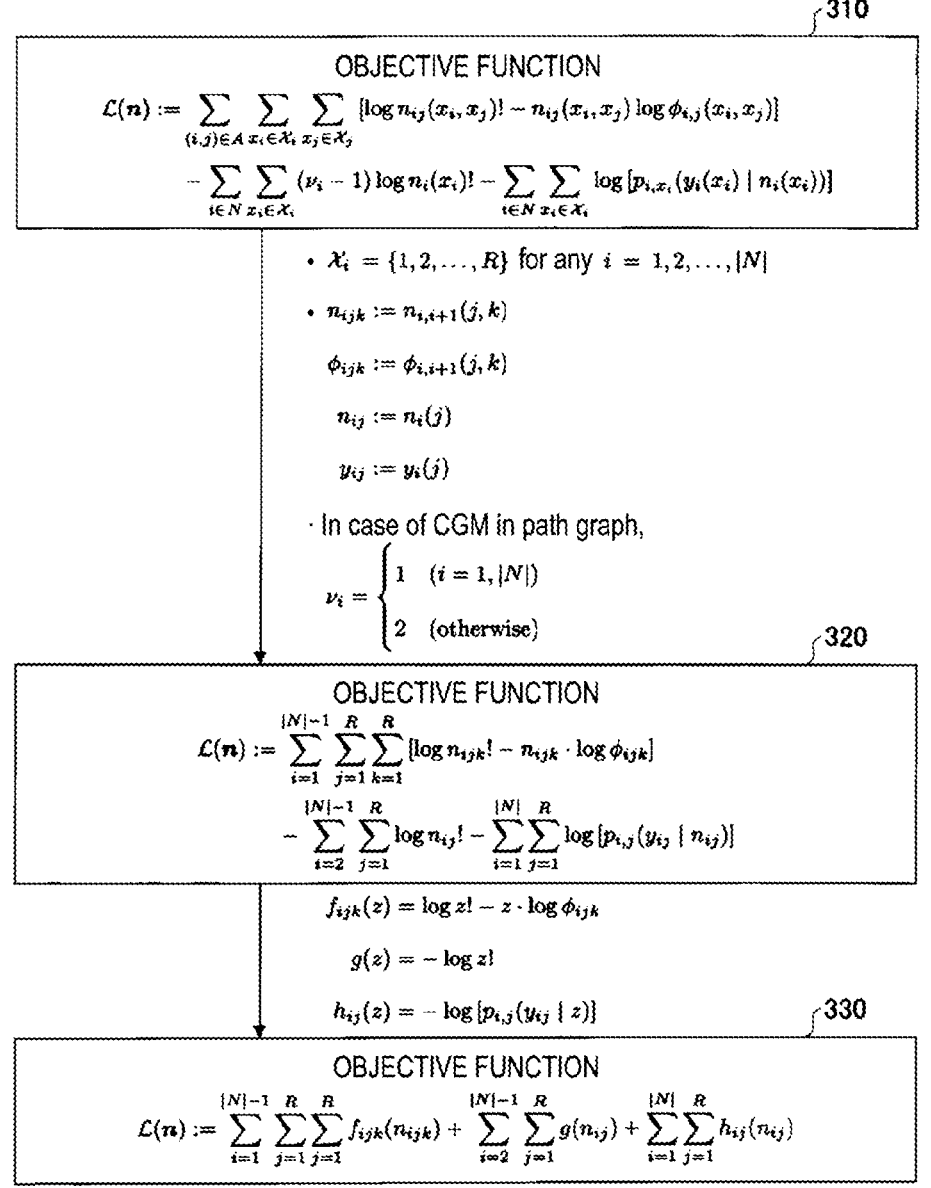
FIG. 3 is a third diagram for explaining the overview of MAP estimation on a CGM.

First, an overview of MAP estimation on a CGM in a path graph will be described. FIGS. 1 to 3 are first to third diagrams for explaining the overview of MAP estimation on a CGM.

Here, let H=(N, A) be an undirected graph, and consider a CGM expressed by a probability mass function shown in the following formulas (1) and (2) (see reference numeral 110 in FIG. 1).

[Math. 1]

$$p(x, \theta) = Pr(X = x; \theta) \tag{1}$$

$$= \frac{1}{Z(\theta)} \prod_{(i,j) \in A} \phi_{ij}(x_i, x_j; \theta) \tag{2}$$

In the above formulas (1) and (2), the symbols are, $\phi_{ij}(x_i, x_j | \theta)$: Local potential defined for random variable $(X_i, X_j)$ $Z(\theta)$ : Normalization constant (distribution function)　　[Math. 2]

wherein a random variable $X_i$ takes values in a finite set $\chi_i$　　[Math. 3]

and a random variable $X_j$ takes values in a finite set $\chi_j$　　[Math. 4]

Denoting samples of random variables in the above CGM as $$X^{(1)}, \ldots, X^{(M)} \qquad \text{[Math. 5]}$$

contingency tables for vertices $$n_i = (n_i(x_i) | x_i \in \chi_i) \qquad \text{[Math. 6]}$$

and contingency tables for edges $$n_{ij} = (n_{ij}(x_i, x_j) | x_i \in \chi_i, x_j \in \chi_j) \qquad \text{[Math. 7]}$$

can be defined by the following formulas (3) and (4) (see reference numeral 120 in FIG. 1).

[Math. 8]

$$n_i(x_i) = \sum_{m=1}^{M} \mathbb{I}\left(X_i^{(m)} = x_i\right), \tag{3}$$

$$n_{ij}(x_i, x_j) = \sum_{m=1}^{M} \mathbb{I}\left(X_i^{(m)} = x_i, X_j^{(m)} = x_j\right) \tag{4}$$

In the above formulas (3) and (4), $\mathbb{I}(\bullet)$ is an indicator function.

With these definitions, a distribution of n (referred to as a CGM distribution) can be expressed by the following formulas (6), (7), and (8) (see reference numeral 130 in FIG. 1).

[Math. 9]

$$p(n; \theta) = M! \cdot \frac{\prod_{i \in N} \prod_{x_i \in \chi_i} (n_i(x_i)!)^{\gamma_i - 1}}{\prod_{(i,j) \in A} \prod_{x_i \in \chi_i, x_j \in \chi_j} n_{ij}(x_i, x_j)!} \cdot g(n, \theta) \cdot \mathbb{I}\left(n \in \mathbb{L}_m^2\right) \tag{6}$$

$$g(n, \theta) = \frac{1}{Z(\theta)^M} \prod_{(i,j) \in A} \prod_{x_i, x_j} \phi(x_i, x_j, \theta)^{n_{ij}(x_i, x_j)} \tag{7}$$

$$\mathbb{L}_M^Z = \left\{ \begin{array}{l} n \in \mathbb{Z}_{\geq 0}^{|n|} \mid M = \sum_{x_i} n_i(x_i) \forall\, i \in N,\, n_i(x_i) = \sum_{x_i} n_{ij}(x_i, x_j) \\ \forall\, i \in N,\, x_i \in \chi_i,\, j \in N(i) \end{array} \right\} \tag{8}$$

Meanwhile, observed values y are generated from a certain probability distribution p(y|n) representing observation noise. Typical examples include a model in which values $n_{ij}$ of edges are observed (formula (9) below) and a model in which values $n_i$ of vertices are observed (formula (10) below) (see reference numeral 210 in FIG. 2).

[Math. 10]

$$p_{edge}(y \mid n) = \prod_{(i,j) \in A, x_i, x_j} p_{(i,j), x_i, x_j}(y_{ij}(x_i, x_j) \mid n_{ij}(x_i, x_j)) \tag{9}$$

$$p_{node}(y \mid n) = \prod_{i \in N, x_i} p_{i, x_i}(y_i(x_i) \mid n_i(x_i)) \tag{10}$$

In the following, the model in which values $n_i$ of vertices are observed will be considered for ease of explanation.

A posterior distribution of n is given by $$p(n|y; \theta) \propto p(n; \theta) \cdot p(y|n) \qquad \text{[Math. 11]}$$

(see reference numeral 220 in FIG. 2). The MAP estimation on the CGM is the maximum a posteriori estimation (maximization problem) of n, and expressed as $$\max_n p(n|y; \theta) \qquad \text{[Math. 12]}$$

(see reference numeral 230 in FIG. 2).

Here, considering a minimization problem of $$-\log p(n|y;\theta) \qquad \text{[Math. 13]}$$

(see reference numeral 240 in FIG. 2) by reformulating the MAP estimation in the above CGM, the MAP estimation on the CGM is none other than solving an optimization problem (minimization problem) shown in the following formula (11) (see reference numeral 250 in FIG. 2).

[Math. 14]

$$\min_n \mathcal{L}(n) \qquad (11)$$

$$\text{s.t. } M = \sum_{x_i} n_i(x_i)(\forall\, i \in N),$$

$$n_i(x_i) = \sum_{x_j} n_{ij}(x_i, x_j)(\forall\, (i, j) \in A, \forall\, x_i \in \chi_i),$$

$$n_i(x_i) \in \mathbb{Z}_{\geq 0} \;\; (\forall\, i \in N, \forall\, x_i \in \chi_i),$$

$$n_{ij}(x_{ij}) \in \mathbb{Z}_{\geq 0} \;\; (\forall\, (i, j) \in A, \forall\, x_i \in \chi_i, \forall\, x_j \in \chi_j).$$

Here, the objective function in the above formula (11) is as shown in the following formula (12) (see reference numeral 310 in FIG. 3).

[Math. 15]

$$\mathcal{L}(n): \sum_{(i,j)\in A} \sum_{x_i \in \chi_i} \sum_{x_j \in \chi_j} [\log n_{ij}(x_i, x_j)! - n_{ij}(x_i, x_j)\log\phi_{i,j}(x_i, x_j)] - \qquad (12)$$

$$\sum_{i\in N} \sum_{x_i \in \chi} (v_i - 1)\log n_i(x_i)! - \sum_{i\in N} \sum_{x_i \in \chi_i} \log\left[ p_{i,x_i}(y_i(x_i) \mid n_i(x_i)) \right]$$

Here, for ease of explanation, $$X_i = \{1, 2, \ldots, R\} \qquad \text{[Math. 16]}$$

is defined for any i=1, 2, . . . , |N|, and $$n_{ijk} := n_{i,i+1}(j,k)$$

$$\phi_{ijk} := \phi_{i,i+1}(j,k)$$

$$n_{ij} := n_i(j)$$

$$y_{ij} := y_i(j) \qquad \text{[Math. 17]}$$

are defined for any i=1, 2, . . ., |N|; then, in the case of a CGM in a path graph, vi is expressed as follows:

[Math. 18]

$$v_i = \begin{cases} 1 & (i = 1, |N|) \\ 2 & (\text{otherwise}) \end{cases} \qquad (13)$$

and hence, the objective function of the formula (12) can be expressed by the following formula (14) (see reference numeral 320 in FIG. 3):

[Math. 19]

$$\mathcal{L}(n): = \sum_{i=1}^{|N|-1} \sum_{j=1}^{R} \sum_{k=1}^{R} [\log n_{ijk}! - n_{ijk} \cdot \log\phi_{ijk}] - \sum_{i=2}^{|N|-1} \sum_{j=1}^{R} \log n_{ij}! = \qquad (14)$$

$$\sum_{i=1}^{|N|} \sum_{j=1}^{R} \log[p_{i,j}(y_{ij} \mid n_{ij})]$$

Further, defining the symbols in the above formula as follows:

$$f_{ijk}(z) = \log z! - z \cdot \log \phi_{ijk}$$

$$g(z) = -\log z!$$

$$h_{ij}(z) = -\log[p_{i,j}(y_{ij}|z)] \qquad \text{[Math. 20]}$$

the objective function of the above formula (14) can be expressed by the following formula (15) (see reference numeral 330 in FIG. 3):

[Math. 21]

$$\mathcal{L}(n) := \sum_{i=1}^{|N|-1} \sum_{j=1}^{R} \sum_{j=1}^{R} f_{ijk}(n_{ijk}) - \sum_{i=2}^{|N|-1} \sum_{j=1}^{R} g(n_{ij}) - \sum_{i=1}^{|N|} \sum_{j=1}^{R} h_{ij}(n_{ij}) \qquad (15)$$

Here, the objective function of the above formula (15) can be explained in a framework of estimating the number of people who have moved between areas at individual time steps from spatiotemporal population data, with the following variables:

$n_{ijk}$: the number of people who have moved from area j to area k over time i to i+1 (moved people count)

$\phi_{ijk}$: a probability of movement (movement probability) from area j to area k over time i to i+1

$n_{ij}$: a true population (without observation noise) in area j at time i $y_{ij}$: an observed population of area j at time i.

Therefore, by solving the optimization problem (formula (11)), $n_{ijk}$ (the number of people who have moved from area j to area k) and $n_{ij}$ (the true population of area j) can be estimated from $y_{ij}$ (the population of area j) and $\phi_{ijk}$ (the probability of movement from area j to area k).

Note that as described above, conventionally, when solving the optimization problem (of equation (11)), Stirling's approximation $$\log x! \approx x \log x - x \qquad \text{[Math. 22]}$$

is applied to the factorial part of the objective function. Therefore, a solution far from a correct solution is output when the total number of samples is small; and A feasible region is continuously relaxed (that is, the constraint of taking only integer values is removed) and a convex programming solver (Reference 1), message passing (Reference 2), or the like is used when optimizing the objective function. Therefore, a solution of a non-integer value (a non-sparse solution) is output.

Reference 1: D. R. Sheldon, T. Sun and T. G. Dietterich, "Approximate Inference in Collective Graphical Models," In Proceedings of the 30th International Conference on Machine Learning, pp. 1004-1012, 2013.

Reference 2: T. Sun, D. R. Sheldon and A. Kumar, "Message Passing for Collective Graphical Model," In Processing of the 32nd International Conference on Machine Learning, pp. 853-861, 2015.

<Overview of Instance of Minimum Cost Flow Problem>

In contrast, in order to solve such problems, the estimation apparatus according to the first embodiment generates an instance of a minimum cost flow problem for performing MAP estimation on a CGM as described above. FIG. 4 is a diagram for explaining an overview of the instance of the minimum cost flow problem. Given a directed graph G=(V, E) as input, and Capacity constraint of each edge $(i,j) \in E: u_{ij} \in \mathbb{Z}{\geq}0$ Cost function of each edge $(i,j) \in E: c_{ij}: \mathbb{Z}{\geq}0 \to \mathbb{R}$ Demand of vertex $i \in V: b_i \in \mathbb{Z}{\geq}0$      [Math. 23]

are assigned as shown in FIG. 4, the minimum cost flow problem determines a flow that minimizes the cost among flows that satisfy the capacity constraint of each edge and the demand constraint of each vertex.

Here, letting $x_{ij}$ be a flow flowing through an edge (i, j), the minimum cost flow problem can be formulated as in the following formula (16) (see reference numeral 410 in FIG. 4).

[Math. 24]

$$\min_{x \in \mathbb{Z}^{|E|}} \cdot \sum_{(i,j) \in E} c_{ij}(x_{ij}),\qquad(16)$$

$$\text{s.t.} \sum_{j:(i,j) \in E} x_{ij} - \sum_{j:(j,i) \in E} x_{ji} = b_i \ (i \in V),$$

$$0 \le x_{ij} \le u_{ij} \ ((i, j) \in E).$$

Then, in order to replace the optimization problem of the objective function (of formula (11)) with the formulated minimum cost flow problem, the estimation apparatus according to the present embodiment generates an instance of the minimum cost flow problem in a directed graph G=(V, E) according to the following procedure (see reference numeral 420 in FIG. 4).

1) Let vertex set be $V=\{o\} \cup (\mathcal{U}^{(1)} \cup v^{(1)}) \cup (\mathcal{U}^{(2)} \cup v^{(2)}) \ldots \cup (\mathcal{U}^{(|N|)} \cup v^{(|N|)}) \cup \{d\}$. Here, $$\mathcal{U}^i := \{u_j^{(i)}\}_{j=1}^R, \ \mathcal{V}^{(s)} := \{v_j^{(i)}\}_{j=1}^R.$$

2) Edges (0, +∞) are created from vertex o to vertices $$u_j^{(1)}$$

for $j \in [R]$.

3) Edges (0, +∞) are created from vertices $$v_j^{(|N|)}$$

to vertex $d$ for $j \in [R]$.

4) Edges $(h_{ij}(z), +\infty)$ are created from vertices $$u_j^{(i)}$$

to vertices $$v_j^{(i)}$$

for $i=1$, $|N|$, $j \in [R]$.

5) Edges $(h_{ij}(z)-g(z), +\infty)$ are created from vertices $$u_j^{(i)}$$

to vertices $$v_j^{(i)}$$

for $i=2, \ldots, |N|-1$, $j \in [R]$.

6) Edges $(f_{ijk}(z), +\infty)$ are created from vertices $$v_j^{(i)}$$

to vertices $$u_k^{(i+1)}$$

for $i \in [|N|-1]$, $j \in [R]$, $k \in [R]$.

7) $b_o=M$, $b_d=-M$, $b_v=0$ ($v \in V\backslash\{o,d\}$) are set.      [Math. 25]

Further, the estimation apparatus according to the present embodiment obtains, the number of people who have moved from area j to k over time i to i+1 (moved people count), and the true population of area j at time i from an optimum solution in the generated instance of the minimum cost flow problem as a solution n* of the optimization problem of the objective function (of formula (11)) according to the following formulas (17) and (18) (see reference numeral 430 in FIG. 4).

[Math. 26]

$$n_{ijk}^*: \text{(Amount of flow flowing}\qquad(17)$$

$$\text{through edge from vertex } v_j^{(i)} \text{ to vertex } u_k^{(i+1)}$$

$$n_{ij}^*: \text{(Amount of flow flowing}\qquad(18)$$

$$\text{through edge from vertex } u_j^{(i)} \text{ to vertex } v_j^{(i)}$$

Here, the solution n* is an optimum solution in the optimization problem of the objective function (of formula (11)). As described above, the estimation apparatus according to the first embodiment replaces the optimization problem of the objective function with an instance of a minimum cost flow problem and solves the instance of the minimum cost flow problem to perform MAP estimation on a CGM.

<Overview of Shortest Path Iteration Method>

Next, a shortest path iteration method used when solving an instance of a minimum cost flow problem will be described. FIG. 5 is a diagram for explaining the shortest path iteration method used when solving an instance of a minimum cost flow problem.

The shortest path iteration method is one of the methods of solving the minimum cost flow problem. Specifically, first, a residual graph is constructed for the minimum cost flow problem and flows are initialized for all edges (i, j) (see reference numeral 510 in FIG. 5).

Next, in the residual graph, a shortest path from each vertex i that satisfies $$b_i - (\Sigma_{j:(i,j)\in E} x_{i,j} - \Sigma_{j:(j,i)\in E} x_{ji}) > 0 \qquad \text{[Math. 27]}$$

to each vertex j that satisfies $$b_j - (\Sigma_{j:(i,j)\in E} x_{ij} - \Sigma_{j:(j,i)\in E} x_{ji}) < 0 \qquad \text{[Math. 28]}$$

is searched. Then, the flows are updated according to the found shortest paths (see reference numeral 530 in FIG. 5). In the shortest path iteration method, the shortest path search and flow update are repeated a number of times corresponding to a required amount of flow M.

When searching for a shortest path, a slow Bellman-Ford method is used because it is also necessary to take into account edges with negative costs. However, a fast Dijkstra method (of Reference 3) can be applied when flows are repeatedly updated while values defined for vertices, which are called potentials, are retained in the algorithm.

Reference 3: R. K. Ahuja, T. L. Magnanti, J. B. Orlin, "Network Flows: Theory, Algorithms and Applications," Prentice Hall, 1993.

<Details of Estimation Apparatus>

Next, the estimation apparatus according to the first embodiment that implements the above estimation method will be described in detail.

(1) Hardware Configuration of Estimation Apparatus

Figure 6:
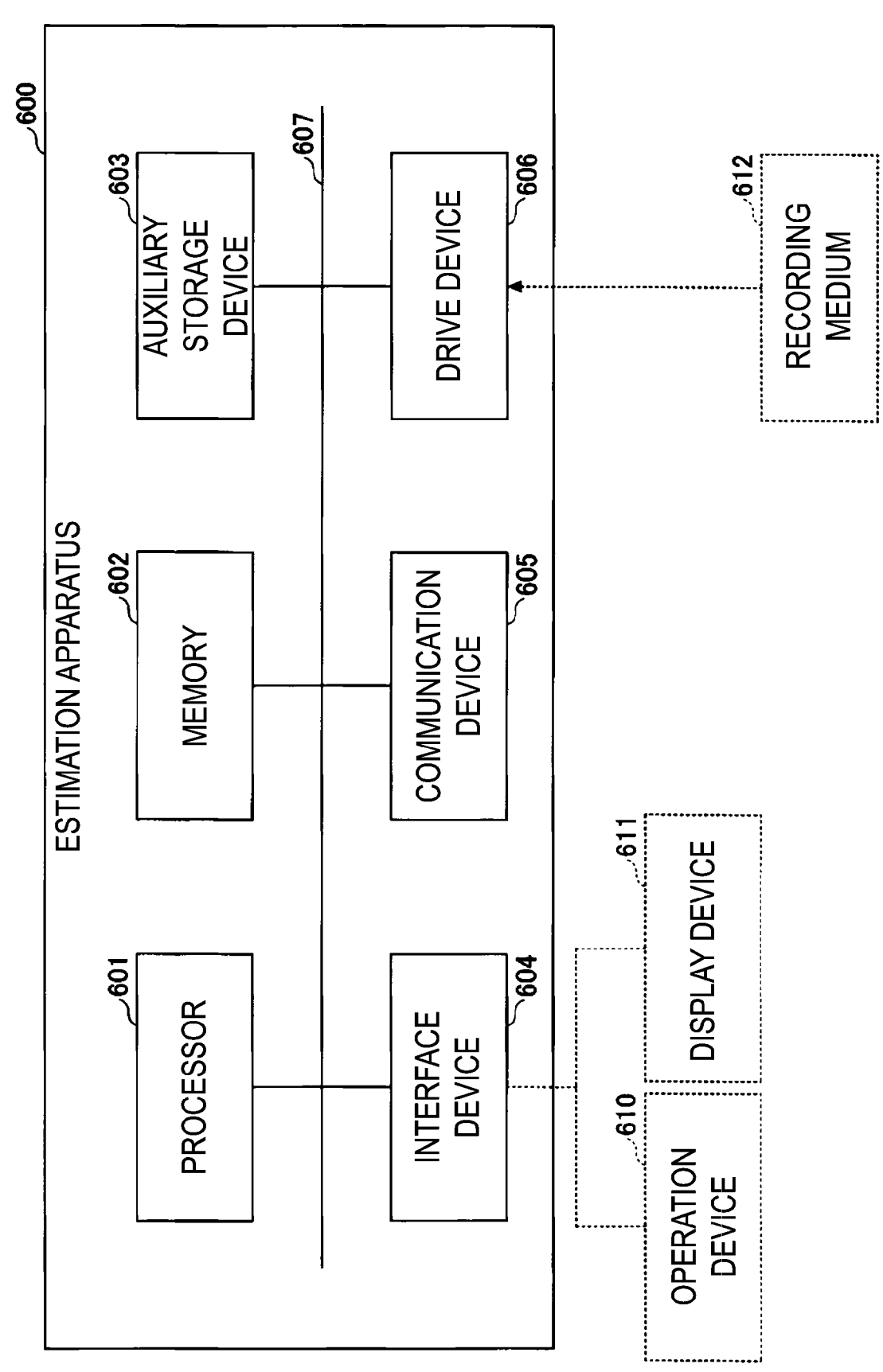
FIG. 6 is a diagram illustrating an example of a hardware configuration of an estimation apparatus.

First, a hardware configuration of the estimation apparatus according to the first embodiment will be described. FIG. 6 is a diagram illustrating an example of the hardware configuration of the estimation apparatus. As illustrated in FIG. 6, the estimation apparatus 600 includes a processor 601, a memory 602, an auxiliary storage device 603, an interface device 604, a communication device 605, and a drive device 606. The hardware components of the estimation apparatus 600 are connected to each other via a bus 607.

The processor 601 includes various arithmetic/logic devices such as a central processing unit (CPU) and a graphics processing unit (GPU). The processor 601 reads and executes various programs (for example, an estimation program that will be described later) on the memory 602.

The memory 602 includes main memory devices such as a read-only memory (ROM) and a random access memory (RAM). The processor 601 and the memory 602 form a so-called computer, and the computer implements various functions by the processor 601 executing various programs loaded in the memory 602.

The auxiliary storage device 603 stores various programs and various data used when the various programs are executed by the processor 601. The auxiliary storage device 603 implements, for example, a movement probability storage unit 711, a spatiotemporal population data storage unit 712, and an estimated moved people count storage unit 713 that will be described later.

The interface device 604 is a connection device for connecting the estimation apparatus 600 with an operation device 610 and a display device 611 which are examples of external devices. The interface device 604 receives an operation on the estimation apparatus 600 through the operation device 610. The interface device 604 also outputs results of processing by the estimation apparatus 600 and displays the results the display device 611.

The communication device 605 is a communication device for communicating with other devices via a network.

The drive device 606 is a device for setting a recording medium 612 therein. The recording medium 612 referred to here includes media that record information optically, electrically, or magnetically such as a CD-ROM, a flexible disk, and a magneto-optical disc. The recording medium 612 may also include semiconductor memories and the like that electrically record information such as a ROM and a flash memory.

Note that various programs are installed in the auxiliary storage device 603, for example, by setting a distributed recording medium 612 in the drive device 606 and reading the various programs recorded on the recording medium 612 by the drive device 606. Alternatively, various programs may be installed in the auxiliary storage device 603 by being downloaded from the network via the communication device 605.

(2) Functional Configuration of Estimation Apparatus

Figure 7:
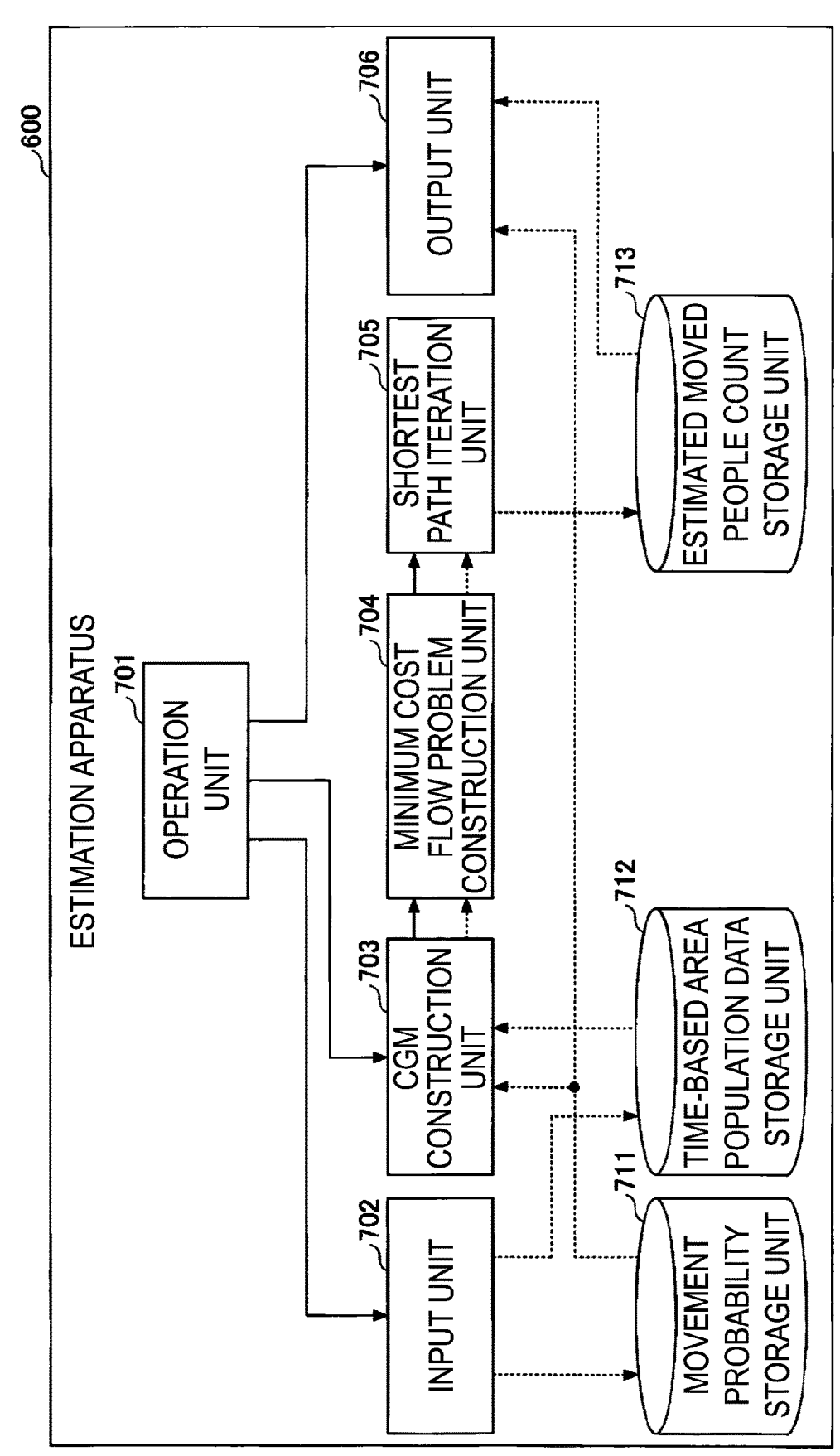
FIG. 7 is a diagram illustrating an example of a functional configuration of the estimation apparatus.

Next, a functional configuration of the estimation apparatus 600 according to the first embodiment will be described. FIG. 7 is a diagram illustrating an example of the functional configuration of the estimation apparatus. The estimation apparatus 600 functions as an operation unit 701, an input unit 702, and a CGM construction unit 703 by an estimation program being installed and executed on the estimation apparatus 600 as described above. The estimation apparatus 600 also functions as a minimum cost flow problem construction unit 704, a shortest path iteration unit 705, and an output unit 706 (see FIG. 7).

The operation unit 701 provides an interface for receiving various instructions for operating the respective units of the estimation apparatus 600. A user of the estimation apparatus 600 inputs various instructions to the estimation apparatus 600 via the interface provided by the operation unit 701.

Instructions input by the user of the estimation apparatus 600 in the first embodiment include an instruction to input movement probability data, an instruction to input spatiotemporal population data, an instruction to execute a process of estimating the number of people who have moved between areas at individual time steps, an instruction to output an estimation result, and the like.

The input unit 702 acquires movement probability data and spatiotemporal population data, which the operation unit 701 has issued an instruction to input, and stores the acquired movement probability data and spatiotemporal population data in the movement probability storage unit 711 and the spatiotemporal population data storage unit 712, respectively.

The CGM construction unit 703 is an example of a construction unit. In response to receiving an instruction to execute a process of estimating the number of people who have moved between areas at individual time steps from the operation unit 701, the CGM construction unit 703 reads the movement probability data and the spatiotemporal population data from the movement probability storage unit 711 and the spatiotemporal population data storage unit 712.

The CGM construction unit 703 also constructs a CGM in a path graph based on the read movement probability data and spatiotemporal population data, and formulates an optimization problem for estimating the number of people who have moved (which corresponds to reference numerals 110 to 330 in FIGS. 1 to 3).

The minimum cost flow problem construction unit 704 is an example of a generation unit. The minimum cost flow problem construction unit 704 formulates a minimum cost flow problem based on both the CGM constructed by the CGM construction unit 703 and the optimization problem for estimating the number of people who have moved, and then, generates an instance of the minimum cost flow problem (which corresponds to FIG. 4).

The shortest path iteration unit 705 is an example of an estimation unit. The shortest path iteration unit 705 solves the generated instance of the minimum cost flow problem using the shortest path iteration method to estimate the number of people who have moved (which corresponds to FIG. 5). The shortest path iteration unit 705 stores the estimated number of people who have moved in the estimated moved people count storage unit 713.

In response to receiving an instruction to output an estimation result from the operation unit 701, the output unit 706 reads the number of people who have moved between areas at individual time steps stored in the estimated moved people count storage unit 713 and the movement probability data stored in the movement probability storage unit 711 and outputs them to the user.

(3) Specific Example of Data Stored in Storage Units of Estimation Apparatus

Next, a specific example of data stored in the storage units (the movement probability storage unit 711, the spatiotemporal population data storage unit 712, and the estimated moved people count storage unit 713) of the estimation apparatus 600 according to the first embodiment will be described. FIG. 8 is a diagram showing an example of data stored in the respective storage units.

Movement probability data 810 is data indicating probabilities of movement between areas at individual time steps. As shown in FIG. 8, the movement probability data 810 includes "departure time stamp", "departure area", "arrival area", and "movement probability" as fields of information.

The fields of "departure time stamp" store time steps (time points at hourly intervals in the example of FIG. 8). The field of "departure area" stores an identifier indicating a source area from which people have moved at a time step stored in a corresponding field of "departure time stamp". The field of "arrival area" stores an identifier indicating a destination area to which people have moved at a time step stored in a corresponding field of "departure time stamp". The field of "movement probability" stores the probability of movement of people from a movement source stored in a corresponding field of "departure area" to a movement destination stored in a corresponding field of "arrival area" at a time step stored in a corresponding field of "departure time stamp".

Spatiotemporal population data 820 is data indicating the population of each area at individual time steps. As shown in FIG. 8, the spatiotemporal population data 820 includes "time stamp", "area ID", and "population information".

The fields of "time stamp" store time steps. The field of "area ID" stores an identifier indicating an area where a population has been observed at a time step stored in a corresponding field of "time stamp". The field of "population information" stores a population observed in an area stored in a corresponding field of "area ID" at a time step stored in a corresponding field of "time stamp".

Estimated moved people count data 830 is data indicating the number of people who have moved that the shortest path iteration unit 705 has estimated by solving the minimum cost flow problem. As shown in FIG. 8, the estimated moved people count data 830 includes "departure time stamp", "departure area", "arrival area", and "estimated moved people count" as fields of information.

The fields of "departure time stamp" store time steps. The field of "departure area" stores an identifier indicating a source area from which people have moved at a time step stored in a corresponding field of "departure time stamp". The field of "arrival area" stores an identifier indicating a destination area to which people have moved at a time step stored in a corresponding field of "departure time stamp". The field of "estimated moved people count" stores an estimation result of the number of people who have moved from a movement source stored in a corresponding field of "departure area" to a movement destination stored in a corresponding field of "arrival area" at a time step stored in a corresponding field of "departure time stamp".

Figure 9:
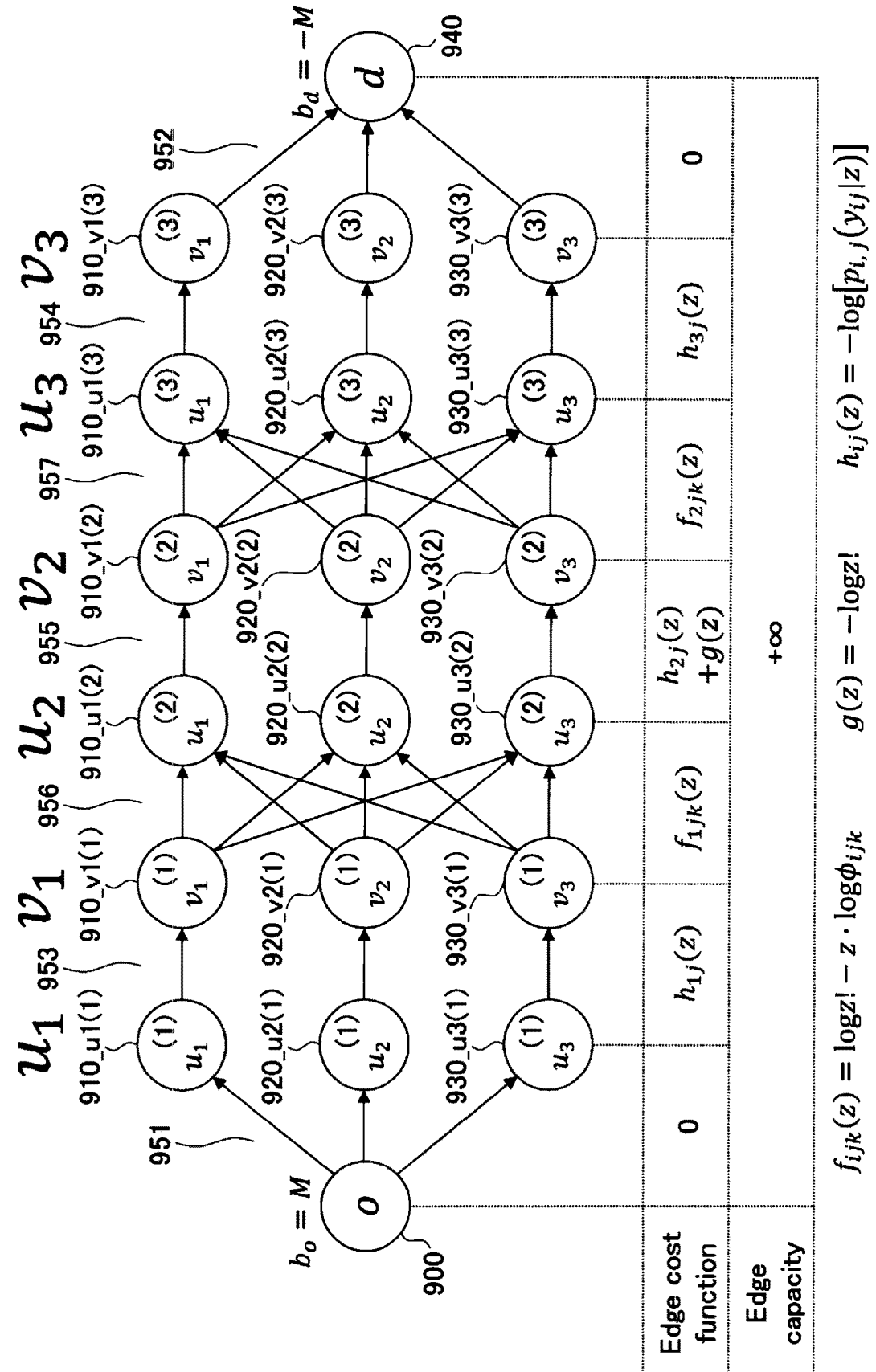
FIG. 9 is a diagram showing an example of generating an instance of a minimum cost flow problem.

(4) Example of Generating Instance of Minimum Cost Flow Problem by Estimation Apparatus Next, an example of generating an instance of the minimum cost flow problem by the minimum cost flow problem construction unit 704 of the estimation apparatus 600 according to the first embodiment will be described. FIG. 9 is a diagram showing an example of generating an instance of the minimum cost flow problem. A generation example in which an instance of the minimum cost flow problem is generated according to a procedure indicated by reference numeral 420 in FIG. 4 will be described with reference to FIG. 9. In FIG. 9, it is assumed that $|N|=3$ and $R=3$ for ease of explanation.

1) A vertex set includes a source 900, a sink 940, vertices 910, vertices 920, and vertices 930.

2) Edges $(0, +\infty)$ are created from the source 900 to vertices 910_u1(1), 920_u2(1), and 930_u3(1) of time stamp 1 ($i=1$) (see reference numeral 951).

3) Edges $(0, +\infty)$ are created from vertices 910_v1(3), 920_v2(3), and 930_v3(3) of time stamp 3 ($i=3$) to the sink 940 (see reference numeral 952).

4) For time stamp 1 ($i=1$), edges $(h_{1j}(z), +\infty)$ are created from vertices 910_u1(1), 920_u2(1), and 930_u3(1) to vertices 910_v1(1), 920_v2(1), and 930_v3(1) (see reference numeral 953). For time stamp 3 ($i=3$), edges $(h_{3j}(z), +\infty)$ are created from vertices 910_u1(3), 920_u2(3), and 930_u3(3) to vertices 910_v1(3), 920_v2(3), and 930_v3(3) (see reference numeral 954).

5) For time stamp 2 ($i=2$), edges $(h_{2j}(z)+g(z), +\infty)$ are created from vertices 910_u1(2), 920_u2(2), and 930_u3(2) to vertices 910_v1(2), 920_v2(2), and 930_v3(2) (see reference numeral 955).

6) For time stamp 1 ($i=1$), edges $(f_{1jk}(z), +\infty)$ are created
    from vertex 910_v1(1) to vertices 910_u1(2), 920_u2(2), and 930_u3(2),
    from vertex 920_v2(1) to vertices 910_u1(2), 920_u2(2), and 930_u3(2), and
    from vertex 930_v3(1) to vertices 910_u1(2), 920_u2(2), and 930_u3(2) (see reference numeral 956).

Also, for time stamp 2 ($i=2$), edges $(f_{2jk}(z), +\infty)$ are created
    from vertex 910_v1(2) to vertices 910_u1(3), 920_u2(3), and 930_u3(3),
    from vertex 920_v2(2) to vertices 910_u1(3), 920_u2(3), and 930_u3(3), and from vertex 930_v3(2) to vertices 910_u1(3), 920_u2(3), and 930_u3(3) (see reference numeral 957).

7) $b_o$=M, $b_d$=−M, and $b_v$=0 are set (see source 900 and sink 940).

In this way, the minimum cost flow problem construction unit 704 generates an instance of the minimum cost flow problem.

Figure 10:
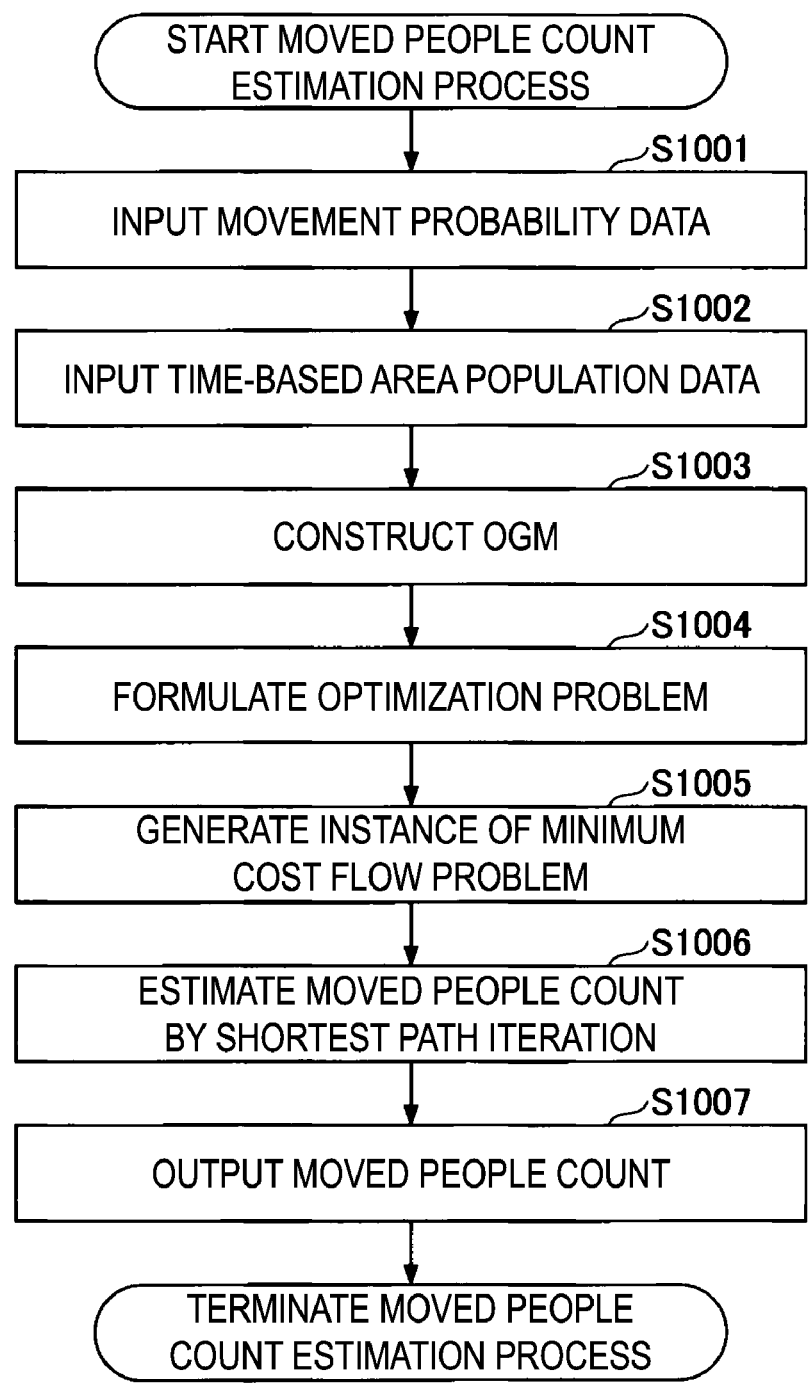
FIG. 10 is a flowchart showing a flow of a moved people count estimation process.

(5) Flow of Moved People Count Estimation Process Performed by Estimation Apparatus Next, a flow of a moved people count estimation process performed by the estimation apparatus 600 will be described. FIG. 10 is a flowchart showing the flow of the moved people count estimation process.

In step S1001, the input unit 702 acquires movement probability data based on an instruction from the operation unit 701, and stores the movement probability data in the movement probability storage unit 711.

In step S1002, the input unit 702 acquires spatiotemporal population data based on an instruction from the operation unit 701, and stores the spatiotemporal population data in the spatiotemporal population data storage unit 712.

In step S1003, the CGM construction unit 703 reads the movement probability data and the spatiotemporal population data from the movement probability storage unit 711 and the spatiotemporal population data storage unit 712, respectively, and constructs a CGM in a path graph.

In step S1004, the CGM construction unit 703 formulates an optimization problem of an objective function, and the minimum cost flow problem construction unit 704 formulates a minimum cost flow problem.

In step S1005, the minimum cost flow problem construction unit 704 generates an instance of the minimum cost flow problem for estimating the number of people who have moved based on both the constructed CGM and the optimization problem for estimating the number of people who have moved.

In step S1006, the shortest path iteration unit 705 estimates the number of people who have moved by solving the minimum cost flow problem using a shortest path iteration method.

In step S1007, the output unit 706 outputs the number of people who have moved between areas at individual time steps and the input movement probability data.

<Summary>

As is apparent from the above description, the estimation apparatus 600 according to the first embodiment, acquires spatiotemporal population data and movement probability data indicating a probability of movement between areas, constructs a CGM in a path graph for estimating the number of people who have moved between areas from the spatiotemporal population data and the movement probability data between areas, generates an instance of a minimum cost flow problem for performing MAP estimation in the constructed CGM, solves the instance of the minimum cost flow problem using a shortest path iteration method to estimate the number of people who have moved between areas at individual time steps, and outputs the estimated number of people who have moved between areas at individual time steps.

As described above, the estimation apparatus 600 according to the first embodiment replaces the optimization problem of the objective function with an instance of a minimum cost flow problem to implement an estimation method in which Stirling's approximation is not applied to the factorial part of the objective function, and the feasible region is not continuously relaxed when optimizing the objective function.

As a result, according to the estimation apparatus 600 according to the first embodiment, it is possible to avoid problems that are caused in the MAP estimation on a CGM when estimating the number of people who have moved between areas at each time stamp from spatiotemporal population data, where the problems are:

a solution far from a correct solution is output when the total number of samples is small; and a solution of a non-integer value (a non-sparse solution) is output, and it is possible to output more accurate and sparse solutions.

That is, the estimation apparatus 600 according to the first embodiment can improve the estimation accuracy when estimating the number of people who have moved between areas at individual time steps based on spatiotemporal population data.

Second Embodiment

Although the first embodiment has been described above assuming that a shortest path iteration method is used when solving an instance of a minimum cost flow problem, the method of solving an instance of a minimum cost flow problem is not limited to the shortest path iteration method.

Note that the present invention is not limited to the configurations shown here, which include the configurations or the like described in the above embodiments, combinations thereof with other elements, and the like. In these regards, configurations can be changed without departing from the gist of the present invention and can be appropriately defined according to the application form thereof.

REFERENCE SIGNS LIST

600: Estimation apparatus
701: Operation unit
702: Input unit
703: CGM construction unit
704: Minimum cost flow problem construction unit
705: Shortest path iteration unit
706: Output unit
810: Movement probability data
820: Spatiotemporal population data
830: Estimated moved people count data

The invention claimed is:

1. An estimation apparatus comprising:

a memory; and a processor configured to execute:

receiving spatiotemporal population data and a probability of movement between areas as input;

constructing a collective graphical model (CGM) in a path graph for estimating a number of people who have moved between areas from the spatiotemporal population data and the probability of movement between areas;

generating an instance of a minimum cost flow problem for performing maximum a posteriori (MAP) estimation on the constructed CGM;

solving the instance of the minimum cost flow problem to estimate the number of people who have moved between areas at individual time steps, wherein the instance of the minimum cost flow is solved by iterating a shortest path search and a flow update until a required amount of flow M is satisfied, wherein solving the instance of the minimum cost flow is based on having a minimum number of sample data; and outputting the estimated number of people who have moved between the areas at the individual time steps.

2. The estimation apparatus according to claim 1, wherein the solving solves the instance of the minimum cost flow problem using a shortest path iteration method to estimate the number of people who have moved between areas at the individual time steps.

3. An estimation method executed by a computer including a memory and a processor, the estimation method comprising:

receiving spatiotemporal population data and a probability of movement between areas as input;

constructing a collective graphical model (CGM) in a path graph for estimating a number of people who have moved between areas from the spatiotemporal population data and the probability of movement between areas;

generating an instance of a minimum cost flow problem for performing maximum a posteriori (MAP) estimation in the constructed CGM;

solving the instance of the minimum cost flow problem to estimate the number of people who have moved between areas at individual time steps, wherein the instance of the minimum cost flow is solved by iterating a shortest path search and a flow update until a required amount of flow M is satisfied, wherein solving the instance of the minimum cost flow is based on having a minimum number of sample data; and outputting the estimated number of people who have moved between areas at the individual time steps.

4. The estimation method according to claim 3, wherein, in the solving solves the instance of the minimum cost flow problem using a shortest path iteration method to estimate the number of people who have moved between areas at the individual time steps.

5. A non-transitory computer-readable recording medium having computer-readable instructions stored thereon, which when executed, cause a computer to execute an estimation process comprising:

receiving spatiotemporal population data and a probability of movement between areas as input;

constructing a collective graphical model (CGM) in a path graph for estimating a number of people who have moved between areas from the spatiotemporal population data and the probability of movement between areas;

generating an instance of a minimum cost flow problem for performing maximum a posteriori (MAP) estimation in the constructed CGM;

solving the instance of the minimum cost flow problem to estimate the number of people who have moved between areas at individual time steps, wherein the instance of the minimum cost flow is solved by iterating a shortest path search and a flow update until a required amount of flow M is satisfied, wherein solving the instance of the minimum cost flow is based on having a minimum number of sample data; and outputting the estimated number of people who have moved between areas at the individual time steps.

* * * * *